United States Patent
Hessler et al.

(10) Patent No.: US 9,814,062 B2
(45) Date of Patent: Nov. 7, 2017

(54) METHOD AND DEVICE FOR TRANSMISSION SCHEDULING

(71) Applicant: Telefonaktiebolaget L M Ericsson (publ), Stockholm (SE)

(72) Inventors: Martin Hessler, Linköping (SE); Jonas Fröberg Olsson, Ljungsbro (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 225 days.

(21) Appl. No.: 14/652,837

(22) PCT Filed: Dec. 21, 2012

(86) PCT No.: PCT/SE2012/051480
§ 371 (c)(1),
(2) Date: Jun. 17, 2015

(87) PCT Pub. No.: WO2014/098685
PCT Pub. Date: Jun. 26, 2014

(65) Prior Publication Data
US 2015/0327289 A1    Nov. 12, 2015

(51) Int. Cl.
*H04J 3/00* (2006.01)
*H04J 1/00* (2006.01)
(Continued)

(52) U.S. Cl.
CPC ..... *H04W 72/1268* (2013.01); *H04W 72/082* (2013.01); *H04W 72/1231* (2013.01); *H04W 88/08* (2013.01)

(58) Field of Classification Search
CPC ........... H04W 72/1268; H04W 72/082; H04W 88/08; H04W 72/1231
See application file for complete search history.

(56) References Cited

U.S. PATENT DOCUMENTS

2007/0086406 A1* 4/2007 Papasakellariou .... H04W 16/04
                                                         370/343
2010/0091730 A1    4/2010 Jang et al.
(Continued)

FOREIGN PATENT DOCUMENTS

EP    1919244 A2    5/2008
EP    1919244 A3    5/2008
(Continued)

OTHER PUBLICATIONS

European Patent Office Communication with Search Report dated Jul. 14, 2016, in Application No. 12890392.9-1857/2936868, 4 pages.
(Continued)

*Primary Examiner* — Kiet Tang
(74) *Attorney, Agent, or Firm* — Baker Botts, LLP (57) ABSTRACT

A scheduling device (200) for User Equipments, UEs (130), in a first cell (120) in a cellular (100), arranged (202) to receive information regarding one or more other cells (125) in the cellular communications network (100) that should be given interference protection against transmissions from UEs (130) in the first cell (120) during one or more specified future TTIs. The scheduling device (200) is also being arranged (202) to receive information regarding interference that transmissions from UEs (130) in the first cell (120) cause in the one or more other cells (125), and to classify UEs (130) in the first cell (120) according to said interference caused by transmissions from said UEs (130) in cells (125) that should be given interference protection in said one or more specified future TTIs, and to schedule transmissions from UEs (130) in the first cell (120) in future TTIs with respect to said classification.

26 Claims, 3 Drawing Sheets

(51) Int. Cl.
*H04W 72/12* (2009.01)
*H04W 72/08* (2009.01)
*H04W 88/08* (2009.01)

(56) References Cited

U.S. PATENT DOCUMENTS

| | | |
|---|---|---|
| 2010/0238884 A1 | 9/2010 | Borran et al. |
| 2013/0231125 A1 | 9/2013 | Jeon et al. |
| 2014/0071836 A1* | 3/2014 | Panchal ............ H04W 72/1205 370/248 |

FOREIGN PATENT DOCUMENTS

| | | |
|---|---|---|
| EP | 2 469 951 | 6/2012 |
| JP | 2007243425 | 9/2007 |
| WO | WO 2009019074 A1 | 2/2009 |
| WO | WO 2009132133 A1 | 10/2009 |
| WO | WO 2010/135718 | 11/2010 |

OTHER PUBLICATIONS

PCT Written Opinion of the International Searching Authority for International application No. PCT/SE2012/051480, Feb. 11, 2014.
PCT International Search Report for International application No. PCT/SE2012/051480, Feb. 11, 2014.

* cited by examiner

METHOD AND DEVICE FOR TRANSMISSION SCHEDULING

PRIORITY

This nonprovisional application is a U.S. National Stage Filing under 35 U.S.C. §371 of International Patent Application Serial No. PCT/SE2012/051480, filed Dec. 21, 2012, and entitled "METHOD AND DEVICE FOR TRANSMISSION SCHEDULING."

TECHNICAL FIELD

The present invention discloses a method and a device for transmission scheduling in a cellular communications network.

BACKGROUND

In a cellular communications network such as an LTE network, the uplink transmissions of a User Equipment, a UE, are scheduled by the eNodeB of the cell of the UE. The uplink transmissions of a UE are scheduled a certain amount of TTIs, Transmission Time Intervals, in advance. The uplink transmissions are usually scheduled by the eNodeB using some kind of metric or scheme, one example being the so called Proportional Fair, PF, metric.

The PF metric attempts to weight UEs with different long-term average channel conditions for each TTI and with the predicted channel conditions for the TTI that is being scheduled. However, scheduling uplink transmissions for UEs in one cell may cause interference in neighboring cells, which cannot be foreseen by the eNodeB in those cells in their scheduling, for example in a PF scheme in the eNodeB in those cells.

Besides scheduling UEs in a cell, the eNodeB of a cell also performs so called link adaptation of the UEs in the cell, which involves estimating the Signal to Noise and Interference Ratio, the SINR, when a transmission will be received by the eNodeB or the UEs (depending on the transmission direction, uplink or downlink), and the amount of information which can be transmitted reliably in future TTIs in view of the estimated SINR, a process which is usually referred to as link adaptation.

The scheduling decisions (uplink or downlink) taken by a scheme such as the PF metric are difficult to predict, and the interference that transmissions in one cell causes in neighboring cells is also difficult to predict, which causes a large "back-off" in the link adaptation.

SUMMARY

It is an object to obviate at least some of the disadvantages mentioned above, and to provide improved scheduling in a cell in a cellular communications system. The improved scheduling will in turn allow for improved link adaptation.

This object is obtained by means of a scheduling device for scheduling transmissions from User Equipments, UEs, in a first cell in a cellular communications network.

The scheduling device is arranged to receive information regarding one or more other cells in the cellular communications network that should be given interference protection against transmissions from UEs in the first cell during one or more specified future Transmission Time Intervals, TTIs.

The scheduling device is also arranged to receive information regarding interference that transmissions from UEs in the first cell cause in the one or more other cells. The scheduling device is also arranged to classify UEs in the first cell according to the interference caused by their transmissions in cells that should be given interference protection in the one or more specified future TTIs. The scheduling device is also arranged to schedule transmissions from UEs in the first cell in future TTIs with respect to this classification.

Thus, by means of the scheduling device described above, it is possible to define cells which should be given interference protection from UEs in the scheduling device's "own" cell, and by means of the classification described above, the scheduling device can refrain from scheduling UEs which are known to cause a high degree of interference in cells which are to be protected.

Also, the scheduling device may take a decision regarding whether or not the amount of users in the "own" cell that cause interference in a cell which should be protected is sufficient to warrant "re-arranging" the scheduling of transmissions from UEs in the scheduling device's "own" cell.

In embodiments, the scheduling device is additionally arranged to receive information regarding the degradation of the quality of service provided to the UEs in each of the one or more other cells which will be caused by interference from transmissions from UEs in the first cell, and to use this information when classifying UEs in the first cell. In such embodiments, if a UE in the scheduling device's "own" cell causes a high degree of interference in a neighboring cell, but the interference causes little degradation in that cell, there may be no need to refrain from scheduling the UE in TTIs during which the interfered cell should be protected. Also, the scheduling device may take a decision regarding whether or not the amount of users in the "own" cell that cause interference and/or degradation to the quality of service to the UEs in a cell which should be protected is sufficient to warrant "re-arranging" the scheduling of transmissions from UEs in the scheduling device's "own" cell.

In embodiments, the scheduling device is additionally arranged to use an interference threshold T for the one or more other cells when scheduling transmissions from UEs in the first cell in future TTIs, and to perform its scheduling so that the interference threshold T in the one or more other cells will not be exceeded by transmissions from the UEs in the first cell in the specified future TTIs.

In embodiments, the scheduling device is additionally arranged to be informed of the number S of UEs that will be scheduled for transmission in future TTIs in the one or more other cells. The scheduling device is arranged to use the path gain $P_{12}$ of transmissions from a UE in the first cell to the one or more other cells together with the threshold T and the number S of UEs, and to only schedule UEs in the first cell for transmission in the specified future TTIs which fulfill the criteria $P_{12}*S^{\beta}<T$, where $\beta$ is a predetermined constant.

In embodiments, the scheduling device is additionally arranged to use the output power level of UEs in the first cell when scheduling transmissions from UEs in the first cell in future TTIs, so that a UE i with output power level $G_i$ is only scheduled for transmission in the specified future TTIs if it fulfills the condition $G_i*P_{12}*S^{\beta}<T$.

In embodiments, the scheduling device is additionally arranged to use the path gain $P_{12}$ of transmissions from a UE in the first cell to the one or more other cells as well as the UE's pathgain $P_{11}$ within the first cell when scheduling transmissions from UEs in the first cell in future TTIs, so that a UE is only scheduled for transmission in the specified future TTIs if it fulfills the condition $[P_{12}/P_{11}]<T$.

In embodiments, the scheduling device is additionally arranged to receive an average value W of the UEs that are scheduled for transmissions in one or more future TTIs by a second cell in the cellular communications network. The scheduling device is arranged to use the path gain $P_{12}$ of transmissions from a UE in the first cell to the second cell and the threshold T, and the scheduling device is arranged to perform its scheduling so that a UE is only scheduled for transmission in the specified future TTIs if it fulfills the condition $P_{12}*W<T$.

In embodiments, the scheduling device is arranged to transmit scheduling information to a second cell in the cellular communications network and to receive from the second cell a TTI pattern indicating the interference that will be induced the scheduled transmissions in future TTIs of UEs in the second cell. The scheduling device is arranged to use the TTI pattern for link adaptation. In some such embodiments, the scheduling information is the average number of UEs that are scheduled for transmission in a certain number of future TTIs in the first cell. In some embodiments of the scheduling device, the scheduling information is the average number of UEs in the first cell that have data for transmission.

In embodiments, the scheduling device is arranged to receive scheduling information from a second cell in the cellular communications network, and to use the scheduling information when scheduling transmissions from UEs in the first cell in said specified future TTIs and to transmit to the second cell a TTI pattern indicating the first cell's scheduled UE transmissions in future TTIs. In some such embodiments of the scheduling device, the scheduling information is the average number of UEs scheduled for transmission in a certain number of future TTIs in the second cell, while in some embodiments the scheduling information is the average number of UEs in the second cell that have data for transmission. In some embodiments the scheduling information is the average number of UEs in the second cell that have been scheduled during a certain number of TTIs, and in other embodiments the scheduling information is the estimated number of UEs scheduled for transmission in a certain number of future TTIs in the second cell.

In embodiments, the scheduling information can further include thresholds and information about the drop in quality of service expected in neighboring cells This object is also obtained by means of a method for scheduling transmissions from User Equipments, UEs, in a first cell in a cellular communications network. Suitably the method is carried out in an eNodeB in an LTE system, although it can also be carried out in other nodes in an LTE system. The method comprises receiving information regarding one or more other cells in the cellular communications network that should be given interference protection against transmissions from UEs in the first cell during one or more specified future Transmission Time Intervals, TTIs.

The method also comprises receiving information regarding interference that transmissions from UEs in the first cell cause in the one or more other cells.

The method comprises classifying UEs in the first cell according to the interference caused by transmissions from said UEs in the one or more other cells that should be given interference protection in the specified future TTIs, and the method further comprises scheduling transmissions from UEs in the first cell in future TTIs with respect to this classification.

In embodiments, the method additionally comprises receiving information regarding the degradation of the quality of service provided to the UEs in each of the one or more other cells that will be caused by said interference, and using this information when classifying the UEs in the first cell.

In embodiments, the method additionally comprises receiving information regarding the degradation of the quality of service provided to the UEs in each of the one or more other cells that will be caused by said interference, and using this information when classifying the UEs in the first cell.

In embodiments, the method additionally comprises using an interference threshold T for the one or more other cells in the scheduling of transmissions from UEs in the first cell in future TTIs, and performing said scheduling so that said interference threshold T in the one or more other cells will not be exceeded by transmissions from the UEs in the first cell in said specified future TTIs.

BRIEF DESCRIPTION OF THE DRAWINGS

The invention will be described in more detail in the following, with reference to the appended drawings, in which.

DETAILED DESCRIPTION

Embodiments of the present invention will be described more fully hereinafter with reference to the accompanying drawings, in which embodiments of the invention are shown. The invention may, however, be embodied in many different forms and should not be construed as being limited to the embodiments set forth herein. Like numbers in the drawings refer to like elements throughout.

The terminology used herein is for the purpose of describing particular embodiments only, and is not intended to limit the invention.

Figure 1:
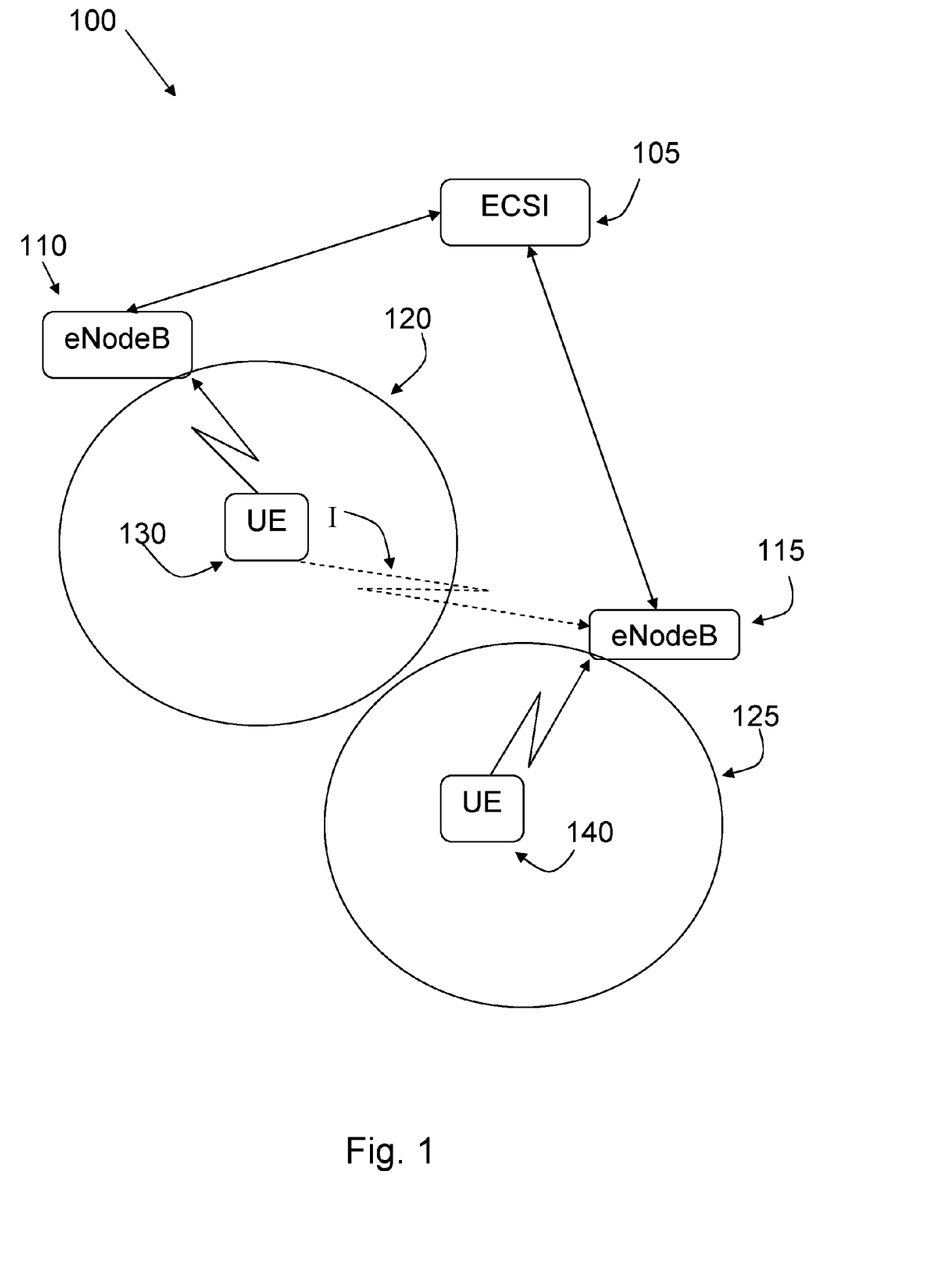
FIG. 1 shows an example of a cellular communications network.

FIG. 1 shows a schematic view of a cellular telecommunications system 100, which will be describe using terminology from the LTE standard. In the cellular telecommunications system 100, there is comprised a plurality of cells, two of which, 120, 125, are shown in FIG. 1. Each cell 120, 125, can accommodate a number of User Equipments, UEs, one of which is shown in each of the two cells 120, 125 with the reference numbers 130, 140. For each of the cells 120, 125, there is controlling node, a so called eNodeB, shown as 110 and 115 in FIG. 1. The eNodeBs in turn, also communicate with, and are to an extent controlled by, a Entity for Collaborative Scheduling Information, an ECSI, 105. The ECSI of the two eNodeBs 110, 115, does not need to be the same, although this is the case in the example shown in FIG. 1.

Each UE thus makes transmissions to its eNodeB, so called uplink, UL, transmissions, and receives transmissions from its eNodeB, so called downlink, DL, transmissions. As indicated by means of an arrow shown as "I" in FIG. 1, UL transmissions from an UE may be received in adjacent cells and cause interference in those cells. The interference shown in FIG. 1 is caused by UL transmissions, but naturally, DL transmissions in one cell may also cause interference in adjacent cells. In addition, although the interference in FIG. 1 is shown only as interference from the cell 120 to the cell 125, interference in the other direction is of course also a risk, both in the case of DL and UL transmissions.

The UL transmissions of the UEs in a cell are scheduled by a scheduling function in the cell's eNodeB, i.e. an eNodeB comprises a scheduling function, which can also be seen as a scheduling device within the eNodeB. The schedule for the UL transmissions which is made by the scheduling function or device is then transmitted to the UEs in the cell. The UL transmission schedule is defined in so called Transmission Time Intervals, TTIs, so that a UL transmission schedule is valid for a defined amount of future TTIs.

Figure 2:
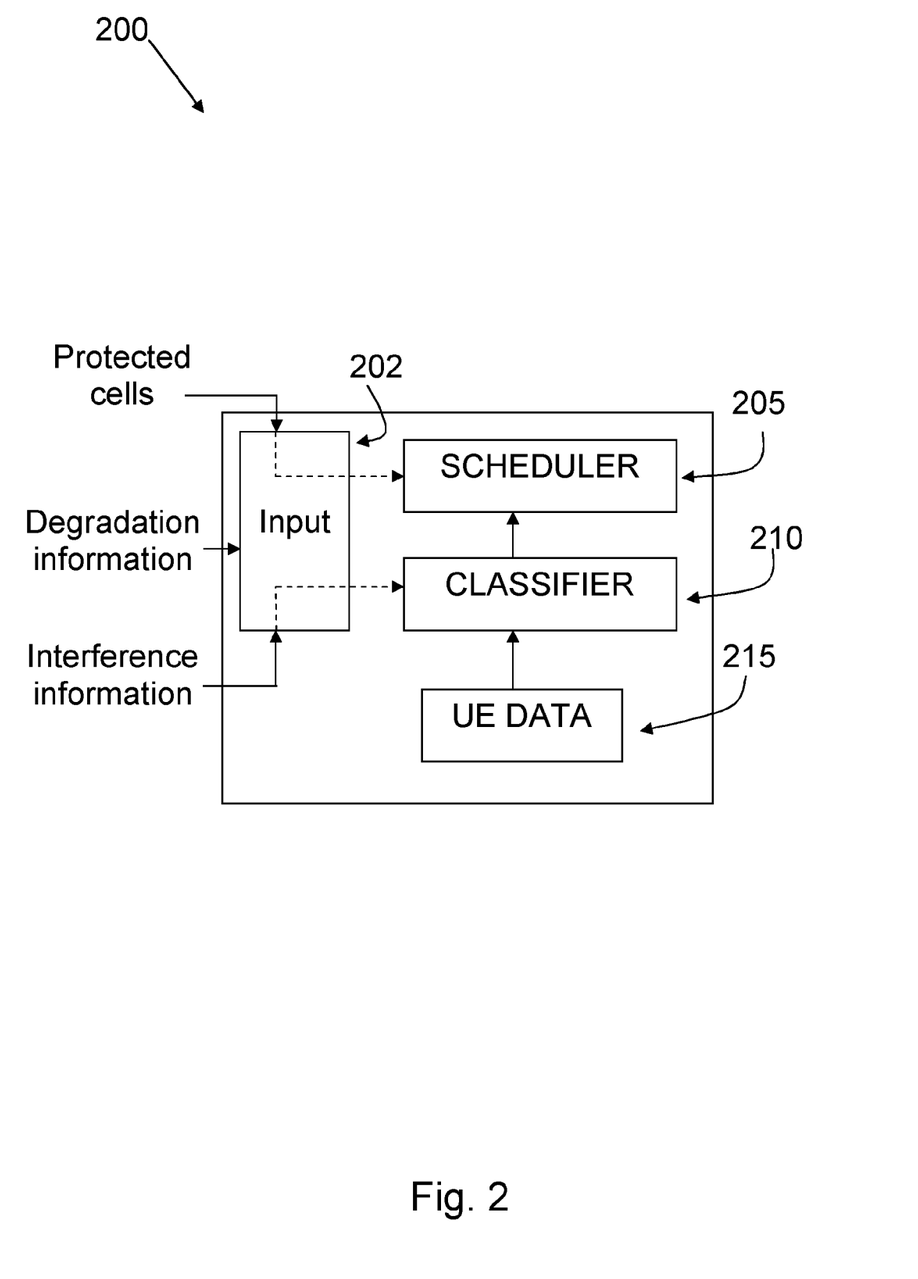
FIG. 2 shows a block diagram of a scheduling device.

FIG. 2 shows a schematic block diagram of a scheduling device 200 intended to reduce the interference caused by UL transmissions between cells in a cellular communications system such as the one shown in FIG. 1. The scheduling device 200 is suitably arranged in an eNodeB, although it can of course be arranged in other units in a cellular communications system as well, e.g. in an ECSI or in one or more UEs. In the following however, as an example, the scheduling device 200 will be described as being comprised in the eNodeB 110 of the cell 120.

As indicated in FIG. 2, the scheduling device 200 comprises an input unit 202, a scheduler unit 205, a classifier unit 210 and a unit 215 for retrieving UE data. The function and interaction of these units will be described in the following. It should however be pointed out that the functions of the units shown in FIG. 2 can be carried out by units divided in other ways, e.g. there could be one common unit for handling all of the functions of the units of FIG. 2, or these functions could be divided among a variety of units.

As shown in FIG. 2, there is comprised an input unit 202 in the scheduling device 200. Via the input unit 202, the scheduling device 200 is arranged to receive information regarding "protected cells", i.e. one or more other cells which should be protected from UL transmissions from UEs in the cell which the eNodeB 110 controls, i.e. UEs in the cell 120. Suitably, the information regarding the protected cells is received from the ECSI 105 of the eNodeB 110, although it could also be received from another node in the system 100 which is tasked with making decisions regarding the protection of one or more cells in the cellular system 100.

The information regarding the "protected cells" is suitably transmitted and received in the form of a list, a table, a matrix etc. The protected cells can be identified by their cell IDs, frequencies etc, but in one embodiment, protection is conferred on a certain type of cell, e.g. a Pico-cell or a Macro-cell. The type of cell can then be identified, for example, by a numeral, so that the ECSI 105 transmits a pattern of protected cells, for example 01201001. This pattern would then indicate that in future TTIs 0, 3, 5 and 6, there are no protected cells, and that in specified future TTIs, i.e. TTIs 1, 4 and 7, Pico-cells are to be protected, and that in another specified future TTI, i.e. TTI 2, Macro-cells are to be protected. This type of signaling is naturally based on the fact that the types of cells referred to as "0", "1" and "2" is known by the scheduling device 200 as well as the ECSI 105, which can be done in a number of ways, for example by explicit signaling or during installation of the scheduling device 200 and the ECSI 105. The pattern can be set to be valid for a certain amount of time, or until another pattern is transmitted, etc. Naturally, one and the same ECSI (or other entity which performs this function) can use different patterns for different cells under its control.

As shown in FIG. 2, the scheduling device 200 is also arranged to, via the input unit 202, to receive "interference information", which here is the amount of interference that transmissions from UEs 130 in the first cell 120 cause in one or more other cells, i.e. the "protected cells", for example the cell 125. This information can be received from a variety of sources and in a variety of ways, but in one embodiment, the scheduling device receives from each of the UEs 130 in its "own" cell 120 measurement results on the signal strength of the eNodeBs in the one or more other cells. Together with knowledge about the output powers of said eNodeBs, the scheduling device can estimate the pathgain to the one or more other cells. For reasons of so called "handover", the UEs in a cell will measure the strength of transmissions from neighboring eNodeBs anyways, so the results of these measurements can be made available for relevant UEs. If the scheduling device 200 is arranged in the eNodeB 110 of the cell 120 and knows the strength with which the transmissions from the eNodeB 115 of, for example, the cell 125 are received by the UEs 130 in the cell 120, the scheduling device 200 can determine the pathgain from the cell 125 to the cell 120, which will also be the pathgain in the opposite direction, i.e. from the cell 120 to the cell 125.

The pathgain between the cells 120 and 125 can either be determined by the scheduling device 200 in the manner described above or it can be determined by another unit on the system 100 and be transmitted to the scheduling device 200. For example, the pathgain can be determined by another unit in the eNodeB in which the scheduling device 200 is located. In other embodiments, the pathgain to nearby cells is transmitted to the scheduling device from the ECSI of the cell of the scheduling device 200. In such embodiments, the ECSI is arranged to determine the pathgain between different cells by means of results of measurements carried out by UEs of the cells in the system 100, or the pathgain from a first cell to a second cell is transmitted to the first cell's ECSI, and from there to the second cell's eNodeB, possibly via the second cell's ECSI if the two cells do not share the same ECSI.

Thus, the scheduling device 200 receives information regarding which one or more other cells that should be protected in specified future TTIs, as well as the pathgain from the scheduling device's 200 own cell to those cells. In addition, in embodiments, the scheduling device 200 is also arranged to receive, via its input unit 202, information on the degradation that interference from UEs in the cell of the scheduling device 200 will cause in the one or more other cells. The degradation is here the degradation of quality of service given to the UEs in the one or more other cells, which can also be seen as a loss of "resource value" in the one or more other cells, the resource value being the value to another cell of one or more bits scheduled for transmission by a UE in that cell in a future TTI. The scheduling device 200 can receive this information directly from the eNodeBs of the one or more other cells, so that a number of eNodeBs exchange this information with each other, or the eNodeBs can be arranged to signal the resource value of scheduled bits to their ECSI, in which case the ECSI then distributes this information to the cells concerned, i.e. the resource value of a bit scheduled for transmission by a UE in cell 1 of plurality of N cells is distributed by the ECSI to eNodeBs 2-N. This is under the assumption that all of the N cells have the same ECSI; if this is not the case, the ECSIs involved will also need to exchange the information in question.

The degradation of quality of service given to the UEs in the one or more other cells, or the "resource value" of a bit scheduled for transmission by a UE in a future TTI can for example be expressed as the so called PF-metric value of the bit in question: PF, or Proportional Fair, is a metric commonly used when scheduling UEs for transmission. In such a metric, each scheduled bit will have a certain value, i.e. a PF-metric value, and interference by UL transmissions from UEs in other cells can decrease the number of bits that is scheduled and thus lower the total value in a cell, thereby degrading the quality of service given to the UEs in that cell.

Another example of how to value the transmitted bits and thus the degradation of the quality of service given to the UEs in the one or more other cells include using the value of the transmitted bits as determined by the network operator. The exact monetary policy for determining the value is not within the scope of this invention, but it is possible to take into account, for example, the subscription fee, subscription policy and content delivery policies used by the network operator.

The scheduling device 200 of FIG. 2 has now been shown to be given input on cells that should be protected, as well as the level of interference caused by those UEs in other cells, and, in embodiments, information on degradation in the other cells caused by the UEs in the cell 120. Using this information, the scheduling unit 200 is arranged, by means of a classifier unit 210 to classify the UEs in the cell 120, and by means of a scheduler 205, to schedule transmissions from those UEs in future TTIs with respect to this classification. The classification can for example, use the information listed above together with the output power used by the UEs in the cell 120, which the classifier unit 210 receives from a unit 215 for gathering UE data. If the scheduling device 200 is arranged in the eNodeB 110, the information on the output power level used by the UEs in the cell 120 is known to the eNodeB 110.

The classification of the UEs in the cell 120 can, for example, be according to how much degradation those UEs will cause in other cells, so that UEs which will cause more than a certain degree of degradation in a cell which should be protected in a certain TTI are not scheduled for UL transmission in that TTI. For example, a threshold T can be used, so that if a UE's degradation to a cell which should be protected in TTI x exceeds the threshold T, then that UE is not scheduled for UL transmission in TTI x. The threshold T can be set locally, e.g. by the eNodeB 110, or "globally", i.e. for more than one cell, in which case the threshold T is suitably set by the network, e.g. by the ECSI 105.

In one embodiment, the scheduling device 200 is also arranged, via its input unit 202, to be informed of the number S of UEs that will be scheduled for transmission in future TTIs in another cell 125 which is one of the "protected cells". In one such embodiment, the scheduling device is arranged, by means of the scheduler unit 205, to use the path gain $P_{12}$ of transmissions from a UE 130 in the cell 120 to the cell 125 together with the threshold T and the number S of UEs, and to only schedule an UE 130 in the first cell 120 for transmission in specified future TTIs in which the cell 125 is to be protected if the UE 130 fulfils the criteria $P_{12}*S^\beta<T$, where $\beta$ is a predetermined constant. In one embodiment, the scheduling device 200 is also arranged, by means of the scheduling unit 205, to use the output power level of the UE 130 when scheduling transmissions from the UEs 130 in future TTIs, so that a UE i with output power level $G_i$ is only scheduled for transmission in the specified future TTIs if it fulfills the condition $G_i*P_{12}*S^\beta<T$. It should be pointed out that the term "path gain $P_{12}$ of transmissions from a UE 130 in the cell 120 to the cell 125" refers to the path gain from the UE 130 to the eNodeB of the cell 125. The terminology "path gain to a cell" is used throughout this text with this meaning, i.e. the path gain to a cell's eNodeB, or from the cell's eNodeB, as the case may be.

In another embodiment with a threshold, the eNodeB of a cell, e.g. the cell 125, transmits the average resource value W(125), e.g. the average PF-value, of the UEs that it predicts will be scheduled per future TTI, W(125), to adjacent cells such as the cell 120. The value W(125) can either be transmitted directly between the eNodeBs of the cells, or "relayed" via the ECSI 105. A threshold T(k) is set by the network (suitably the ECSI 105) for a cell category k, e.g. Macro or Pico cells. Then, for a TTI when the cell 125 is in the cell category k, the scheduling device 200 for the cell 120 refrains from scheduling UEs that fulfill the condition $P_{12}*W(125)>T(k)$. In embodiments, W(125) can be set to be $1/R^\beta$, where R is the historic average number of bits that the UEs in the cell (125) have transmitted and $\beta$ is a constant to scale how "fair" the scheduling should be.

In one embodiment with a threshold, each service type and UE category is assigned a weight. This weight can, for example, depend on the bandwidth requirements, the interference sensitivity, delay sensitivity, of the service. The weight can further depend on the UE subscription category, but also the number of simultaneous services the particular UE is running simultaneously etc. Some examples can be given of this:

- Consider VoIP, voice over IP: this is a low bandwidth service, which means that it is possible to compensate a high degree of interference with a less aggressive modulation. Hence each VoIP session should get a low weight, but on the other hand each cell could have many simultaneous VoIP sessions, so the total weight should still be large for the cell.
- Consider UEs running VoIP and web-browsing simultaneously. Such UEs are probably busy with VoIP session, and hence the weight of the UE's web-browsing session could be set lower compared to UEs which are only using web-browsing.
- Consider a "gold-UE" compared to a "bronze UE" running the same service, the "gold-UE" should be weighted higher.

The eNodeB of e.g. the cell 125 transmits the sum of its UEs' weight, Q(125), that it estimates per TTI to the eNodeBs of adjacent cells or of "relevant cells", which are cells with UEs with a high pathgain to the cell 125, the cell 120 being one of them. The sum Q(125) can either be transmitted directly between the eNodeBs of the cells, or "relayed" via the ECSI 105.

A threshold T(k) is set by the network (suitably the ECSI 105) for cell-category k, for example, such that over a certain period of time, 30% of the UEs in some area in the network are above the threshold T(k), where the area in question could, for example, be in a city center. Then for a TTI when the cell 125 is in the category k, the scheduling device 200 refrains from scheduling UEs that fulfill the condition $P_{12}*Q(125)>T(k)$, where $P_{12}$ as previously is the pathgain from the cell 130 to the cell 125.

In another embodiment with a threshold, the eNodeB of the cell 125 transmits the average normalized PF-value $$\frac{1}{(R/K)^\beta}$$

of the scheduled UEs, N(125), to be scheduled per TTI to relevant cells, "relevant" being defined as previously, the cell 120 being one such cell. The value N(125) can either be transmitted directly between the eNodeBs of the cells, or "relayed" via the ECSI 105. K is the target bit-rate compensation factor, which can, for example, be proportional to the target bit-rate. A threshold T(k) is set by the network (suitably the ECSI 105) for cell-category k. Then, for a TTI when the cell 125 is to be protected, the scheduling device 200 for the cell 120 refrains from scheduling UEs that fulfill the condition $P_{12}*N(125)>T(k)$.

In a further embodiment with the threshold T, the scheduling device 200 is additionally arranged, by means of the scheduler unit 205, to use the path gain $P_{12}$ of transmissions from the UE 130 in the first cell 120 to the cell 125 as well as the UE's 130 pathgain $P_{11}$ within the UE's 130 own cell 120, when scheduling transmissions from the UE 130 in the cell 120 in future TTIs, so that the UE 130 is only scheduled for transmission in future TTIs if it fulfills the condition $[P_{12}/P_{11}]<T$.

In a further embodiment with the threshold T, the scheduling device 200 is arranged, by means of the input unit 202, to receive an average value W of the UEs that are scheduled for transmissions in one or more future TTIs by the second cell 125. In such an embodiment, the scheduling device is arranged to use the path gain $P_{12}$ of transmissions from the UE 130 in the first cell 120 to the second cell 125 and the threshold T, so that the scheduling unit 205 of the scheduling device 200 is arranged to perform its scheduling so that the UE 130 is only scheduled for transmission in future TTIs if it fulfills the condition $P_{12}*W<T$. The average value W can be received either directly from the eNodeB 115 of the second cell 125, or via the ECSI 105.

By means of the invention, the scheduling in a cell can be made more optimal with respect to metrics such as the PF-metric. This quality can be further enhanced by also using metric-specific information when generating the patterns of protected TTIs. Thus, in one embodiment it is possible to adjust the pattern of protected TTIs in relation to the number of users below a certain threshold. Here, we only consider a rate threshold, but the threshold can also be adjusted taking into consideration the services and target bitrates of the users. The threshold can be defined, for example, as the $20^{th}$ percentile rate in the system.

In the system 100, for a cell category or for each cell, a low target bit-rate $\bar{R}_{LOW}$ is set. The eNodeB of a number of cells then categorizes the UEs that have a historic average bit-rate below the target as a protected user. Each cell's eNodeB then signals the number of protected TTIs it needs in order to schedule the protected users and/or the number of such users. Each cell can potentially also signal only if the number of protected TTIs is too high or too low in relation to the protected users. The signaled information is used by a pattern generating entity in the network, such as e.g. the ECSI 105.

Observe that this criterion can be formulated as follows: The ratio of protected TTIs should be equal to the "fair resource ratio" between protected UEs and other UEs, as defined by the scheduling metric, e.g. the PF-metric. The pattern generating entity then balances the number of protected TTIs between all cells in each of the protected cell categories. This can, for example, be done by using the average or maximum/minimum number of protected TTIs needed among the cells that will use the same pattern.

A further embodiment will be described using only two cooperating cells, i.e. the cells 120 and 125. It is important to point out that each cell typically has its own a scheduling device 200 as shown in FIG. 2 but that it is possible that the two cells share a common scheduling device.

One of the cells, the first cell, will be considered the "master" cell that receives cooperating information from a second cell, a "slave" cell and determines how to schedule its UEs based on the cooperating information and distribute a selected TTI pattern to the second cell. The pattern indicates the amount of induced interference that the second cell can expect in each TTI from the first cell. The pattern is used in the second cell to improve its link adaptation process.

In one version, the cooperating information is the average number of scheduled UEs in the slave cell. Averaging may be performed using a filter, e.g. $y(n)=(1-a)*y(n-1)+a*x(n)$, where a is a filter constant, $x(n)$ is the number of scheduled UEs in TTI number n and $y(n)$ is the average number of scheduled UEs up to TTI n.

The "master" cell, partitions its users into two groups G1 and G2 with respect to the second cell, as follows:

G1: The set of UEs which fulfill the inequality $RSRP_s - RSRP_c < \alpha \cdot y$, where $RSRP_s$ is the UE's measure of the reference signal received power in dBm from the master cell, and $RSRP_c$ is the UE's measure of the reference received power in dBm from the slave cell and $\alpha$ is a constant or an adjustable variable. In one embodiment, the values $RSRP_s$ and $RSRP_c$ are filtered values of the reported values from the UE.

G2: The set of remaining UE, i.e. "non-G1" UEs.

In some embodiments, the average number of users y is on a linear scale, and in other embodiments it is on a logarithmic scale. In one embodiment, the left-hand side of the above inequality (the definition of G1) is replaced with the path loss from the master cell to the slave cell. In one embodiment, $\alpha$ in the definition of G1 above may be an exponent of y (i.e. $y^\alpha$). In one embodiment, the RSRP measures are obtained using other means than UE measurements reports. On such means is to utilize SRS, Sounding Reference Symbols, that the UEs transmit, and that cooperating cells can measure.

Now, let P be the TTI pattern that the master cell has distributed to the slave cell. The pattern specifies PSF (Protected SubFrames, i.e. Protected TTIs) and nPSF (non-Protected SubFrames, i.e. non-Protected TTIs). If the current TTI is PSF, then only UEs from G2 are scheduled by the scheduling device 200, while in nPSF UEs in G1 may be scheduled by the scheduling device 200.

Let $n_{PSF}(P)$ and $n_{nPSF}(P)$ denote the number of PSF and nPSF in the pattern P. Periodically, the master cell determines if a new pattern should be used and distributed to the slave cell. If $n_{nPSF}(P)/\#G1 < n_{PSF}(P)/\#G2 - \beta$, where #G1 and #G2 are the sizes (possibly filtered over time) of the groups G1 and G2, and $\beta$ is an offset parameter, then the master cell will decide to use a new pattern with fewer PSFs. Similarly, if $n_{nPSF}(P)/\#G1 > n_{PSF}(P)/\#G2 + \beta$, then the master cell will decide to use a new pattern with a larger number of PSFs.

When the master cell decides to use a new pattern $P_{new}$, it sends the new pattern to the slave cell together with a timestamp T (e.g., TTI number) and a time offset $T_{offset}$ that tells the slave cell when the new pattern becomes valid. The master cell will start using the new patter at time $T+T_{offset}$. The time offset $T_{offset}$ is selected based on the backhaul latency: with larger backhaul latency, the offset needs to be larger.

The above criteria for pattern selection aim at a fair radio resource allocation (in terms of scheduled TTIs) between the UEs in groups G1 and G2. Other embodiments may aim at different fairness measures such as minimum, average or maximum throughput, or a throughput percentile. In embodiments where the UEs belong to different service classes (i.e. QoS) the criteria may only involve UEs belonging to higher priority service classes.

In the slave cell, the link adaptation is done differently for PSF and nPSF. For example, a fixed SINR offset can be added to the SINR used in the link adaptation. In another embodiment, different link adaptation outer-loop control loops for PSF and nPSF can be used. Yet another embodiment is to measure the historic average interference received independently for the different types of TTIs as indicated by the pattern.

In one embodiment, the cooperating information is the number of users in the slave cell that can be scheduled, i.e. that have a non-zero buffer status.

In other embodiments, cooperating information is not transmitted by the slave cell. In such embodiments, the cooperating information received by first cell can be a threshold Y, wherein α·y in the grouping criteria for G1 is replaced by Y.

In further other embodiments, UEs are grouped into three or more groups.

In one embodiment, the slave cell handles changes in the pattern by adding (other) SINR offsets to SINR used by link adaption in PSF (respectively nPSF) TTIs of new pattern that in a previous pattern was nPSF (respectively PSF).

In one embodiment, there are several slave cells. The master cell functions as described above, with the slight difference that its functions are performed with respect to each slave cell. Thus, the master cell groups its UEs in groups G1(c) and G2(c), and evaluates pattern change criteria with respect to each slave cell. Thus, the master cell may maintain one pattern for each slave cell. When selecting a new pattern, the master cell aims at maximizing the number of common PSF in the patterns for the slave cells.

In one embodiment, the master cell maintains a pattern common for all cells. The grouping of the UEs in the master cell is done in the same way as in the previous embodiments. The pattern selection criteria is, however, different: If $n_{nPSF}(P)/Avg\{\#G1(c)\} < n_{PSF}(P)/Avg\{\#G2(c)\} - \beta$, where $Avg\{\#G1(c)\}$ (respectively $Avg\{\#G2(c)\}$) denotes the average size of the groups G1(c) (respectively G2(c)), then the master cell decides to use a new pattern with fewer PSF. The criterion for deciding to increase the number of PSF is:

$n_{nPSF}(P)/Avg\{\#G1(c)\} > n_{PSF}(P)/Avg\{\#G2(c)\} + \beta$.

In one embodiment, there is no master cell. The cells are thus equal in the sense that each cell maintains and distributes the scheduling patterns to their cooperating cells.

Regarding the communication described above between the master cell and the slave cells, this can be done either directly between the eNodeBs of the cells, or via the ECSI of the cells.

Figure 3:
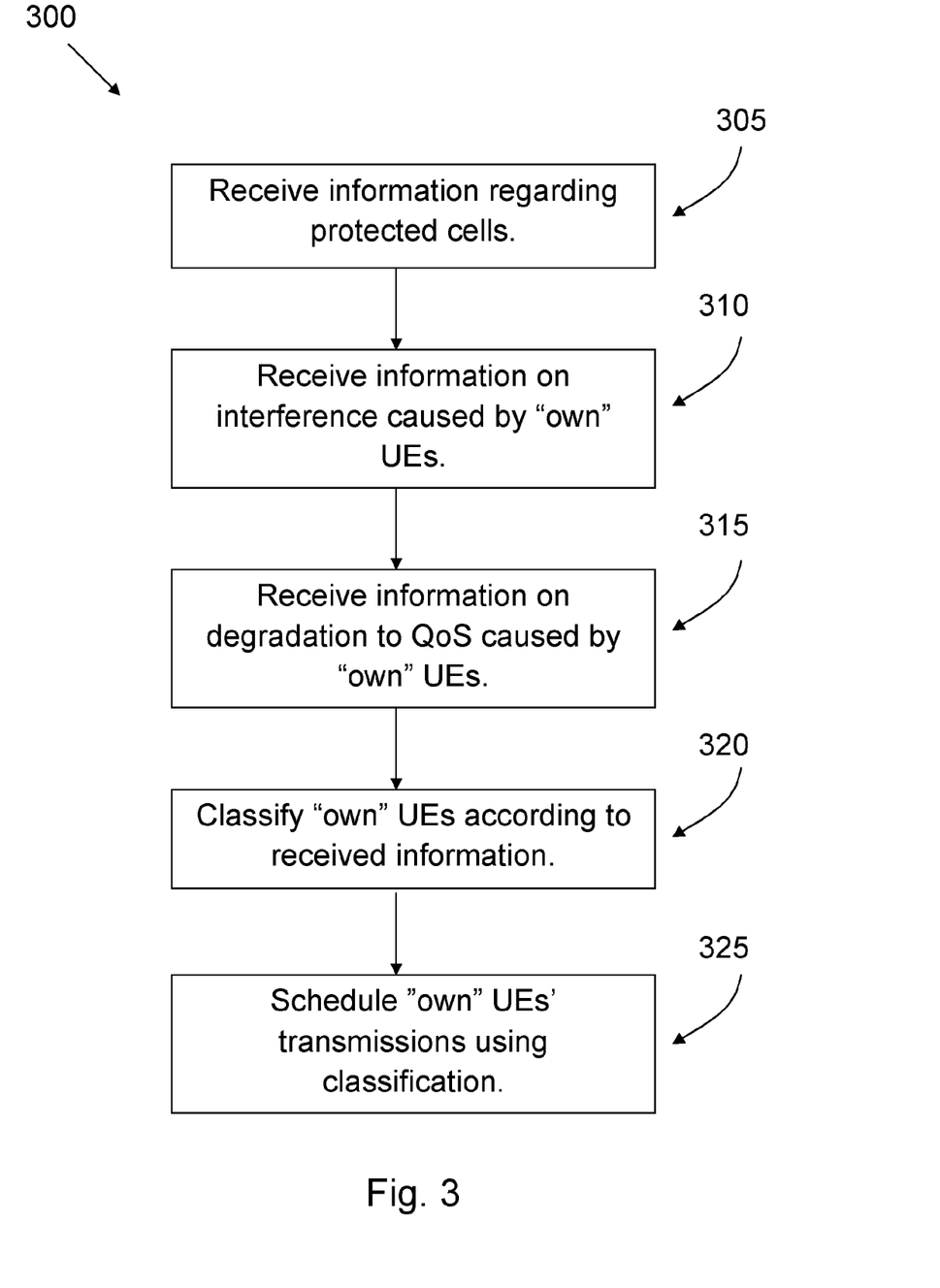
FIG. 3 shows a flow chart of a scheduling method.

FIG. 3 shows a schematic flowchart of a method 300 for scheduling transmissions from User Equipments, UEs, in a first cell in a cellular communications network. Suitably the method is carried out in an eNodeB in an LTE system, although it can also be carried out in other nodes in an LTE system. The method 300 comprises, step 305, receiving information regarding one or more other cells in the cellular communications network that should be given interference protection against transmissions from UEs in the first cell during one or more specified future Transmission Time Intervals, TTIs.

As indicated in step 310, the method 300 also comprises receiving information regarding interference that transmissions from UEs in the first cell cause in the one or more other cells.

As indicated in step 320, the method 300 comprises classifying UEs in the first cell according to the interference caused by transmissions from said UEs in the one or more other cells that should be given interference protection in the specified future TTIs, and the method 300 further comprises, step 325, scheduling transmissions from UEs in the first cell in future TTIs with respect to this classification.

In embodiments, as shown in step 315, the method additionally comprises receiving information regarding the degradation of the quality of service provided to the UEs in each of the one or more other cells that will be caused by said interference, and using this information when classifying the UEs in the first cell.

In embodiments, the method additionally comprises receiving information regarding the degradation of the quality of service provided to the UEs in each of the one or more other cells that will be caused by said interference, and using this information when classifying the UEs in the first cell.

In embodiments, the method additionally comprises using an interference threshold T for the one or more other cells in the scheduling of transmissions from UEs in the first cell in future TTIs, and performing said scheduling so that said interference threshold T in the one or more other cells will not be exceeded by transmissions from the UEs in the first cell in said specified future TTIs.

In embodiments, the method additionally comprises receiving information regarding the number S of UEs that will be scheduled for transmission in future TTIs in said one or more other cells, the method comprising using the path gain $P_{12}$ of transmissions from a UE in the first cell to said one or more other cells together with the threshold T and the number S of UEs, and only scheduling UEs in the first cell for transmission in said specified future TTIs which fulfill the criteria $P_{12}*S^\beta < T$, where β is a predetermined constant.

In embodiments, the method additionally comprises using the output power level of UEs in the first cell when scheduling transmissions from UEs in the first cell in future TTIs, and only scheduling a UE i with output power level $G_i$ for transmission in said specified future TTIs if it fulfills the condition $G_i*P_{12}*S^\beta < T$.

In embodiments, the method additionally comprises using the path gain $P_{12}$ of transmissions from a UE in the first cell to said one or more other cells as well as the UE's pathgain $P_{11}$ within the first cell when scheduling transmissions from UEs in the first cell in future TTIs, and only scheduling a UE for transmission in future TTIs if it fulfills the condition $[P_{12}/P_{11}] < T$.

In embodiments, the method additionally comprises receiving an average value W of the UEs that are scheduled for transmissions in one or more future TTIs by a second cell in the cellular communications network, and the method comprises the use of the path gain $P_{12}$ of transmissions from a UE in the first cell to said second cell and the threshold T, and only scheduling a UE for transmission in future TTIs if it fulfills the condition $P_{12}*W < T$.

In embodiments, the method additionally comprises transmitting scheduling information to a second cell in the cellular communications network and receiving from the second cell a TTI pattern indicating the interference that will be induced by scheduled transmissions in future TTIs of UEs in the second cell, the method comprising using the TTI pattern for link adaptation. In embodiments, the scheduling information is the average number of UEs scheduled for transmission in a certain number of future TTIs in the first cell. In embodiments, the scheduling information is the average number of UEs in the first cell that have data for transmission.

In embodiments, the method comprises receiving scheduling information from a second cell in the cellular communications network, and using this scheduling information when scheduling transmissions from UEs in the first cell in future TTIs, and transmitting to the second cell a TTI pattern indicating the first cell's scheduled UE transmissions in future TTIs. In embodiments, the scheduling information is the average number of UEs scheduled for transmission in a certain number of future TTIs in the second cell. In embodiments, the scheduling information is the average number of UEs in the second cell that have data for transmission.

Embodiments of the invention are described with reference to the drawings, such as block diagrams and/or flowcharts. It is understood that several blocks of the block diagrams and/or flowchart illustrations, and combinations of blocks in the block diagrams and/or flowchart illustrations, can be implemented by computer program instructions. Such computer program instructions may be provided to a processor of a general purpose computer, a special purpose computer and/or other programmable data processing apparatus to produce a machine, such that the instructions, which execute via the processor of the computer and/or other programmable data processing apparatus, create means for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

In some implementations, the functions or steps noted in the blocks may occur out of the order noted in the operational illustrations. For example, two blocks shown in succession may in fact be executed substantially concurrently or the blocks may sometimes be executed in the reverse order, depending upon the functionality/acts involved.

In the drawings and specification, there have been disclosed exemplary embodiments of the invention. However, many variations and modifications can be made to these embodiments without substantially departing from the principles of the present invention. Accordingly, although specific terms are employed, they are used in a generic and descriptive sense only and not for purposes of limitation.

The invention is not limited to the examples of embodiments described above and shown in the drawings, but may be freely varied within the scope of the appended claims.

The invention claimed is:

1. A scheduling device for scheduling transmissions from User Equipments, UEs, in a first cell in a cellular communications network, the scheduling device comprising:
   an interface configured to:
      receive information regarding one or more other cells in the cellular communications network that should be given interference protection against transmissions from UEs in the first cell during one or more specified future Transmission Time Intervals, TTIs;
      receive information regarding interference that transmissions from UEs in the first cell cause in the one or more other cells;
   one or more processors communicatively coupled to the interface, the one or more processors configured to:
      classify UEs in the first cell according to said interference caused by transmissions from said UEs in the one or more other cells that should be given interference protection in said one or more specified future TTIs and an output power used by said UEs in the first cell;
      schedule transmissions from UEs in the first cell in future TTIs with respect to the classification of the UEs in the first cell.

2. The scheduling device of claim 1, wherein the interface is further configured to receive information regarding the degradation of the quality of service provided to the UEs in each of said one or more other cells which will be caused by interference from transmissions from UEs in the first cell, and to use this information when classifying UEs in the first cell.

3. The scheduling device of claim 1, wherein the one or more processors are further configured to use an interference threshold T for said one or more other cells when scheduling transmissions from UEs in the first cell in future TTIs, and to perform said scheduling so that said interference threshold T will not be exceeded by transmissions from the UEs in the first cell in said one or more other cells in said specified future TTIs.

4. The scheduling device of claim 3, additionally being arranged to be informed of the number S of UEs that will be scheduled for transmission in future TTIs in said one or more other cells, the one or more processors being arranged to use the path gain P12 of transmissions from a UE in the first cell to said one or more other cells together with said threshold T and said number S of UEs, and to only schedule UEs in the first cell for transmission in said specified future TTIs which fulfill the criteria $P12*S\beta<T$, where $\beta$ is a predetermined constant.

5. The scheduling device of claim 4, wherein the one or more processors are further configured to use the output power level of UEs in the first cell when scheduling transmissions from UEs in the first cell in future TTIs, so that a UE i with output power level Gi is only scheduled for transmission in said specified future TTIs if it fulfills the condition $Gi*P12*S\beta<T$.

6. The scheduling device of claim 3, wherein the one or more processors are further configured to use the path gain P12 of transmissions from a UE in the first cell to said one or more other cells as well as the UE's pathgain P11 within the first cell when scheduling transmissions from UEs in the first cell in future TTIs, so that a UE is only scheduled for transmission in said specified future TTIs if it fulfills the condition $[P12/P11]<T$.

7. The scheduling device of claim 3, wherein the interface is further configured to receive an average value W of the UEs that are scheduled for transmissions in one or more future TTIs by a second cell in the cellular communications network, and the one or more processors further configured to:
   use the path gain P12 of transmissions from a UE in the first cell to said second cell and said threshold T; and
   perform said scheduling so that a UE is only scheduled for transmission in said specified future TTIs if it fulfills the condition $P12*W<T$.

8. The scheduling device of claim 1, wherein the interface is further configured to transmit scheduling information to a second cell in the cellular communications network and to receive from said second cell a TTI pattern indicating the interference that will be induced by scheduled transmissions in future TTIs of UEs in the second cell, the scheduling device being arranged to use said TTI pattern for link adaptation.

9. The scheduling device of claim 8, in which said scheduling information is the average number of UEs scheduled for transmission in a certain number of future TTIs in the first cell.

10. The scheduling device of claim 8, in which said scheduling information is the average number of UEs in the first cell that have data for transmission.

11. The scheduling device of claim 1, wherein the interface is further configured to: receive scheduling information from a second cell in the cellular communications network;
the one or more processors are configured to use said scheduling information when scheduling transmissions from UEs in the first cell in said specified future TTIs; and
the interface is further configured to transmit to the second cell a TTI pattern indicating the first cell's scheduled UE transmissions in future TTIs.

12. The scheduling device of claim 11, in which said scheduling information is the average number of UEs scheduled for transmission in a certain number of future TTIs in the second cell.

13. The scheduling device of claim 12, in which said scheduling information is the average number of UEs in the second cell that have data for transmission.

14. A method for scheduling transmissions from User Equipments, UEs, in a first cell in a cellular communications network, the method comprising:
receiving information regarding one or more other cells in the cellular communications network that should be given interference protection against transmissions from UEs in the first cell during one or more specified future Transmission Time Intervals, TTIs;
receiving information regarding interference that transmissions from UEs in the first cell cause in the one or more other cells;
classifying UEs in the first cell according to said interference caused by transmissions from said UEs in said one or more other cells that should be given interference protection in said specified future TTIs and an output power used by said UEs in the first cell; and
scheduling transmissions from UEs in the first cell in future TTIs with respect to the classification of the UEs in the first cell.

15. The method of claim 14, additionally comprising receiving information regarding the degradation of the quality of service provided to the UEs in each of said one or more other cells that will be caused by said interference, and using this information when classifying the UEs in the first cell.

16. The method of claim 14, additionally comprising using an interference threshold T for said one or more other cells in the scheduling of transmissions from UEs in the first cell in future TTIs, and performing said scheduling so that said interference threshold T in said one or more other cells will not be exceeded by transmissions from the UEs in the first cell in said specified future TTIs.

17. The method of claim 16, additionally comprising receiving information regarding the number S of UEs that will be scheduled for transmission in future TTIs in said one or more other cells, the method comprising using the path gain P12 of transmissions from a UE in the first cell to said one or more other cells together with said threshold T and said number S of UEs, and only scheduling UEs in the first cell for transmission in said specified future TTIs which fulfill the criteria P12*Sβ<T, where β is a predetermined constant.

18. The method of claim 17, additionally comprising using the output power level of UEs in the first cell when scheduling transmissions from UEs in the first cell in future TTIs, and only scheduling a UE i with output power level Gi for transmission in said specified future TTIs if it fulfills the condition Gi*P12*Sβ<T.

19. The method of claim 16, additionally comprising using the path gain P12 of transmissions from a UE in the first cell to said one or more other cells as well as the UE's pathgain P11 within the first cell when scheduling transmissions from UEs in the first cell in future TTIs, and only scheduling a UE for transmission in future TTIs if it fulfills the condition [P12/P11]<T.

20. The method of claim 16, additionally comprising receiving an average value W of the UEs that are scheduled for transmissions in one or more future TTIs by a second cell in the cellular communications network, the method comprising the use of the path gain P12 of transmissions from a UE in the first cell to said second cell and said threshold T, the method comprising only scheduling a UE for transmission in future TTIs if it fulfills the condition P12*W<T.

21. The method of claim 14, comprising transmitting scheduling information to a second cell in the cellular communications network and receiving from said second cell a TTI pattern indicating the interference that will be induced by scheduled transmissions in future TTIs of UEs in the second cell, the method comprising using said TTI pattern for link adaptation.

22. The method of claim 21, according to which said scheduling information is the average number of UEs scheduled for transmission in a certain number of future TTIs in the first cell.

23. The method of claim 21, according to which said scheduling information is the average number of UEs in the first cell that have data for transmission.

24. The method of claim 14, comprising receiving scheduling information from a second cell in the cellular communications network, and using said scheduling information when scheduling transmissions from UEs in the first cell in future TTIs, and transmitting to the second cell a TTI pattern indicating the first cell's scheduled UE transmissions in future TTIs.

25. The method of claim 24, according to which said scheduling information is the average number of UEs scheduled for transmission in a certain number of future TTIs in the second cell.

26. The method of claim 24, according to which said scheduling information is the average number of UEs in the second cell that have data for transmission.

* * * * *